Figure 1:
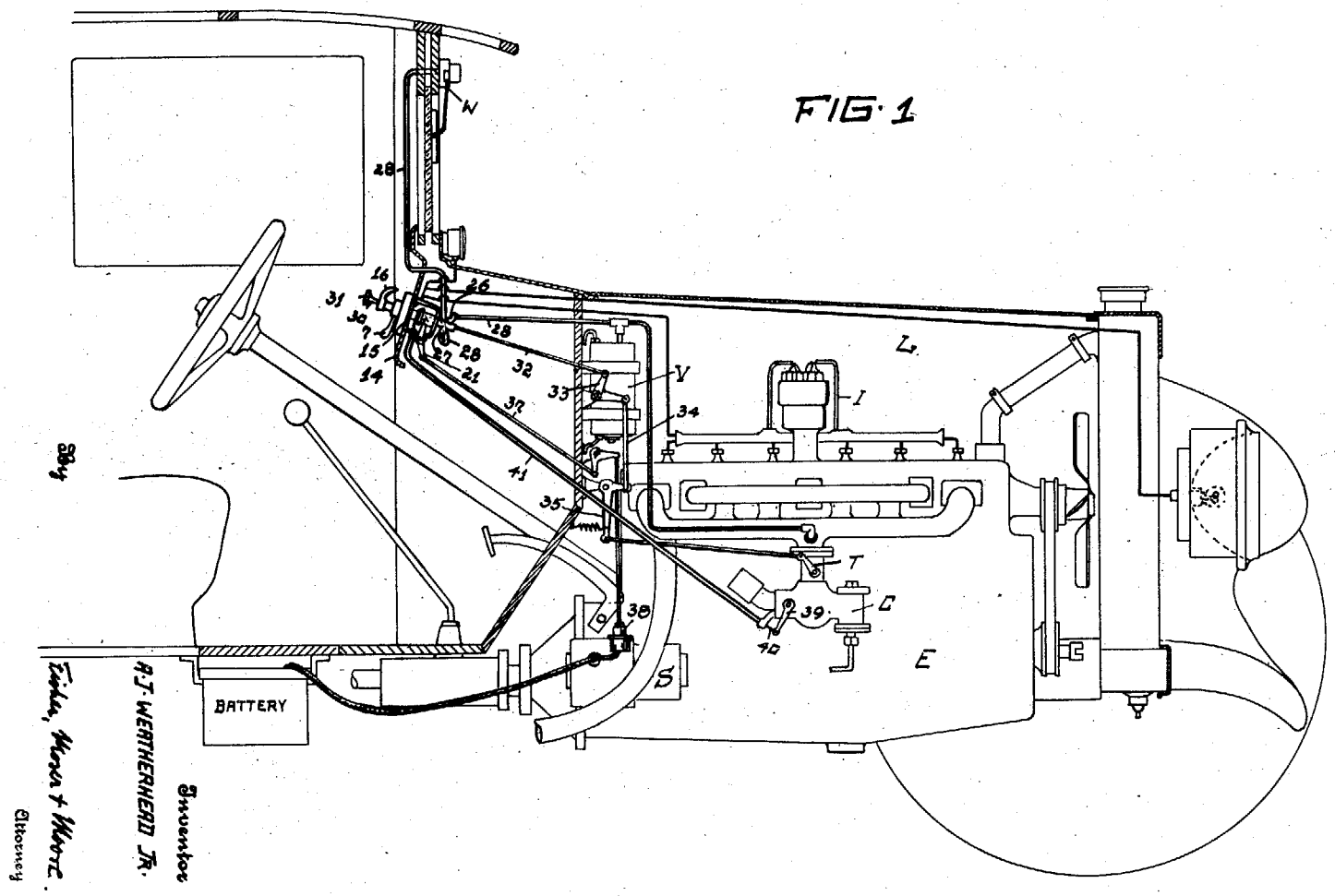

A. J. WEATHERHEAD, JR

Feb. 7, 1933. AUTOMOBILE CONTROLLER AND SWITCH Re. 18,731

Original Filed July 17, 1928 3 Sheets-Sheet 1

A. J. WEATHERHEAD, JR

Feb. 7, 1933. AUTOMOBILE CONTROLLER AND SWITCH Re. 18,731

Original Filed July 17, 1928 3 Sheets-Sheet 2

Inventor

A. J. WEATHERHEAD JR.

By Fisher, Moser & Moore.

Attorney

A. J. WEATHERHEAD, JR

Feb. 7, 1933. AUTOMOBILE CONTROLLER AND SWITCH Re. 18,731

Original Filed July 17, 1928 3 Sheets-Sheet 3

Inventor

By ALBERT J. WEATHERHEAD JR.

Fisher, Moser & Moore, Attorney

Reissued Feb. 7, 1933 Re. 18,731

UNITED STATES PATENT OFFICE

ALBERT J. WEATHERHEAD, JR., OF CLEVELAND, OHIO

AUTOMOBILE CONTROLLER AND SWITCH

Original No. 1,840,548, dated January 12, 1932, Serial No. 293,412, filed July 17, 1928. Application for reissue filed June 17, 1932. Serial No. 617,842.

This invention relates to an improved means for controlling automobiles, the purpose in general being to centralize and combine in a single fitting or attachment unit a plural number of controlling devices, including an electric switch, and is related to my application, Serial No. 293,411, which constitutes an improvement on the device shown herein. This controller may be manipulated by one hand to regulate or adjust two or more operating appliances of the automobile, including the electric switch. To illustrate, it is a common practice to mount a number of manually-operable devices separately in various places upon the dash or instrument board of an automobile, wherewith to control the ignition and lighting systems, the carburetor choke and throttle, the electric starter for the engine, and the wind-shield wiped. Customarily each controlling device has its allotted place on the vehicle, and for convenience of manipulation, two or more are usually closely grouped together. This old practice involves the use of individual fittings mounted independently in various places on the automobile, thereby requiring repetition in effort and labor and considerable cost and expense in constructing and installing such devices, separately. To overcome and obviate all that and to gain other desirable results I provide a single fitting or attachment unit which may be readily affixed in a single opening in the dash or instrument board of the automobile. This unit embodies a plurality of control members which are axially related and which may be manually operated by one hand at one and the same spot or place on the instrument board, whereby rotatable or push and pull movements may be imparted selectively to the appliances under control. Also conjoint motions may be thereby obtained to actuate different appliances concurrently. For example, the present controller unit permits the starter and choke to be actuated independently or conjointly, and it may also be employed to effect independent or conjoint movement of a starter and throttle, a windshield wiper and throttle and choke, a distributor and choke, or any other set or combination of appliances, including an electric switch for controlling the electric ignition circuits of the automobile.

In the acompanying drawings, the figures on sheet 1 and sheet 2 exemplify a fitting or unit with which five distinct controlling movements may be obtained, and the figures on sheet 3 illustrate modified forms of the invention.

Figure 2:
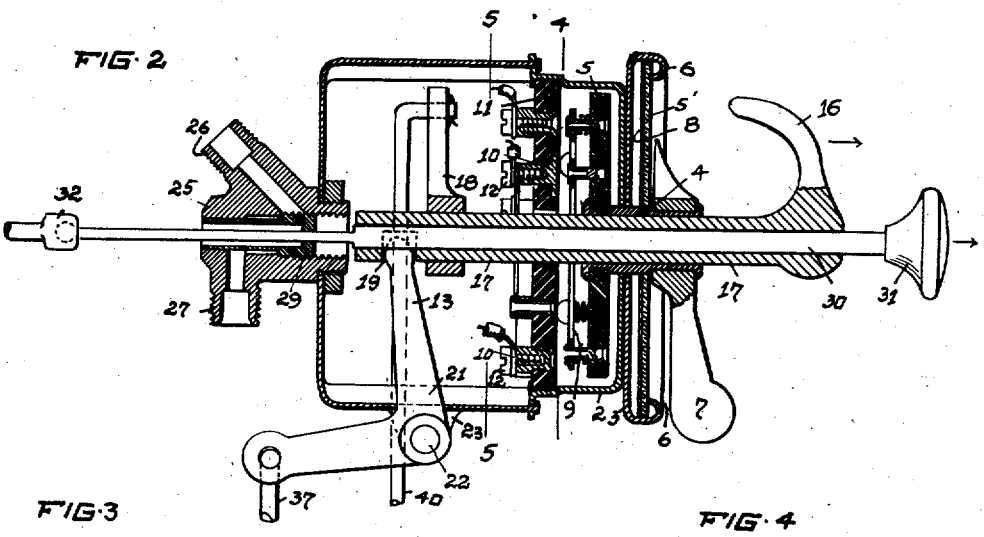
Figure 3:
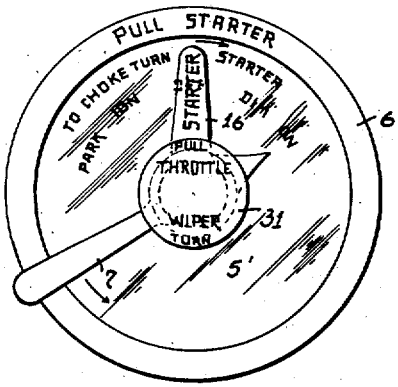
Figure 4:
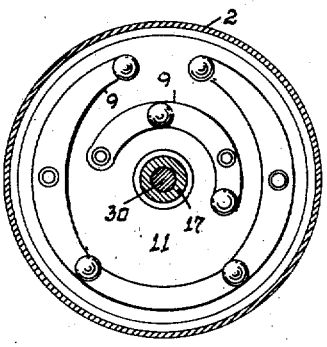
Figure 5:
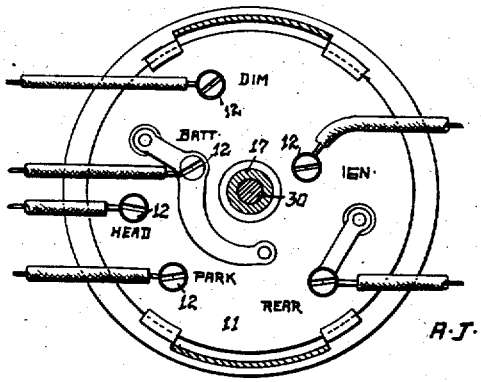
Figure 6:
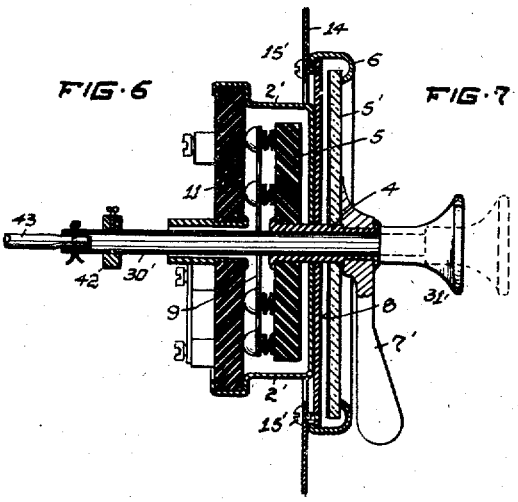
Figure 7:
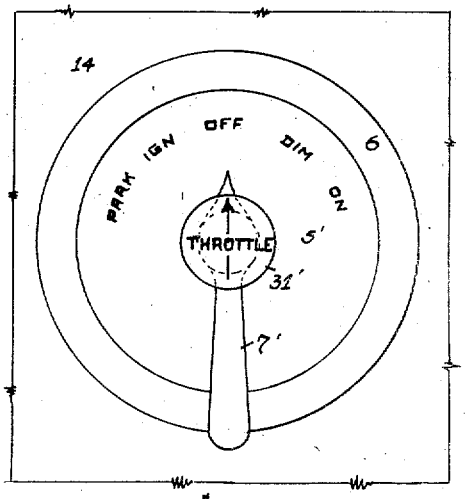
Figure 9:
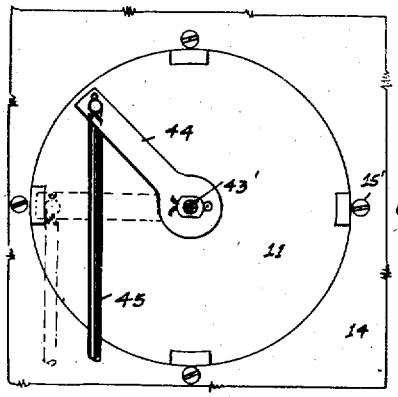
Figure 8:
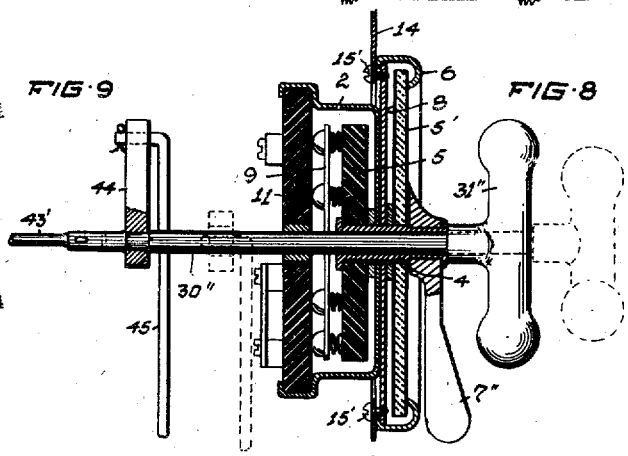
Figure 11:
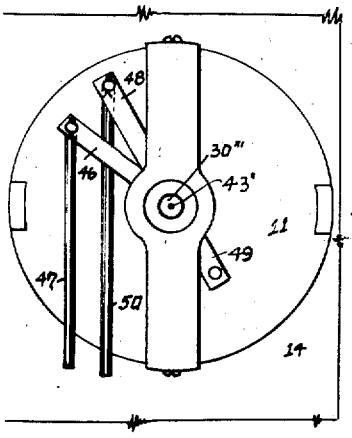
Figure 10:
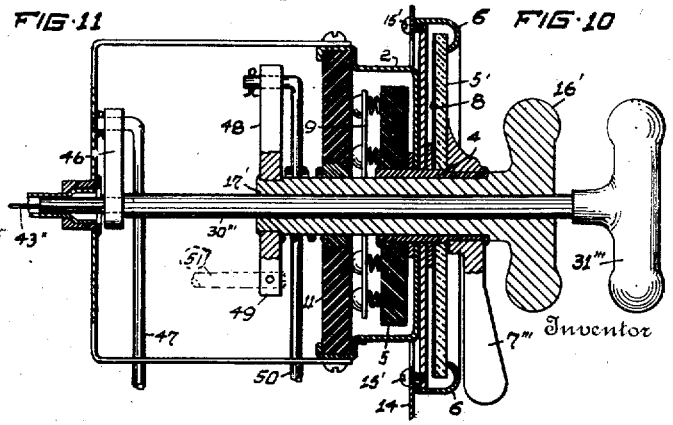

Thus, Fig. 1 is a sectional view of the front half of an automobile, showing a controller unit attached to the instrument board and connected to the choke and throttle of the carburetor, the starter switch, the windshield cleaner, and the electric ignition and lighting system. Fig. 2 is a sectional view, enlarged, of the controller unit itself. Fig. 3 is a front view of the controller dial, and Figs. 4 and 5 cross sectional views on lines 4—4 and 5—5 of Fig. 2, respectively. Fig. 6 is a sectional view of a controller unit which embodies a rotatable switch and a reciprocable control member, and Fig. 7 is a front view thereof. Fig. 8 is a sectional view of a controller unit embodying a rotatable switch and a rotatable pull member, and Fig. 9 is a rear view thereof. Fig. 10 is a sectional view of a controller unit containing a rotatable electric switch, and a pair of rotatable pull members, and Fig. 11 is a rear view thereof.

Referring to Figs. 1–5 inclusive, the controller unit shown therein comprises a circular switch casing 2 to which a circular flanged front plate 3 of larger diameter is secured. A short tubular arbor or shaft 4 has rotatable bearing centrally within the end wall of casing 2, and a disk 5 of insulating material is fixed to the inner end of said arbor or shaft. The outer end of the arbor extends forwardly through front plate 3, and also centrally through a closure plate 5′ of glass which is confined and held in place at its border edge by the inturned flange 6 of plate 3. A handle or lever 7 is secured to the outer end of the arbor or shaft 4 at the front of glass 5′, and a dial or name plate 8 is confined behind the glass. The dial may bear any suitable designating character or descriptive matter to facilitate setting of the control lever 7. For example, lever 7 may control the position of the electric switch which may be turned to different radial positions in switching the ignition circuit on and off and also the lighting circuit of an automobile. The switch mechanism may be of any suitable kind or character, and in the present instance disk 5 carries a set of spring pressed contacts 9 which are adapted to be brought into engagement with contacts 10 carried by stationary wall 11 within the rear end of casing 2. The electric conductors or wires are connected to said contacts 10 by screws 12 or other suitable means. The electric switch mechanism and its casing 2 is adapted to be mounted upon the instrument board 14 of an automobile by merely projecting the round casing 2 through a single round opening 15 within the instrument board, and then securing the same in place by screws 15′ or any other suitable means adapted to unite front plate 3 with the board. As thus mounted and supported the switch casing 2 and the operating parts therein, serve to support and provide a suitable mounting for additional control members. A handle or finger grip 16 having a tubular stem 17 extends through the arbor or shaft 4 and also through rear wall 11 of the switch casing. Stem 17 is round and free to rotate within arbor 4 and a crank arm 18 is fastened to its inner end opposite the rear face of wall 11. The extremity of stem 17 is notched or slotted at 19 to receive the end of one arm 13 of a crank member 21 which is pivoted at 22 to a yoke 23, which is affixed to casing 2. Attached to this yoke axially coincident with the axis of the switch casing and the rotatable push and pull member 16, is a valve body 25 having laterally extending branches 26 and 27, to which small copper pipes 28 may be detachably connected. These pipes extend to and are connected with a vacuum operated wind-shield wiper W and the vacuum tank V on the automobile.

Operation of the windshield wiper is controlled by a valve member 29 which is rotatably confined and screw connected with valve body 25 opposite air ports or passages within the body. Rotation of valve member 29 also produces longitudinal movement thereof, and the means for rotating and shifting the valve member in that manner comprises a rotatable push and pull rod 30 which extends lengthwise of the axis of the rotatable push and pull member 16, the inner end of the rod being flattened where it extends through an opening of corresponding shape within the valve member. The front of or outer end of rod 30 is provided with a knob or handle 31, and the two handles 16 and 31 respectively may be slightly spaced apart to permit independent pull movements thereof. In some instances the spacing between handles 16 and 31 may be such that an outward pull of the inner handle 16 may bring contact between the handles and thereby serve to pull the knob or handle 31 outward in the same movement. In that way two separate appliances on the automobile may be caused to act successively or conjointly, it being understood that inner push and pull rod 30 is designed to rotate the wiper valve member 29 by rotatable movement and to also activate another appliance on the automobile by a push and/or pull movement, and that handle 16 and its stem 17 may be utilized to activate two other appliances or devices on the automobile by imparting a rotatable movement to arm 18 and a tilting movement to crank member 21.

The rotative and pull and push movements may be applied independently or concurrently to handle 16 or knob 31, thus permitting four appliances or devices on the automobile to be operated and controlled separately and independently of each other, while each handle 16 and 31 may also be manipulated to turn and pull simultaneously and thereby actuate and control two working appliances or devices on the automobile simultaneously. The inner handle 16 may also be pulled out and turned and in this movement knob 31 may be engaged by the handle and also pulled out all at the same time, thereby controlling three separate devices on the automobile at practically the same instant, or successively.

To exemplify one working combination in which the single fitting and attachment controller unit is utilized to operate and control five separate and distinct appliances on the automobile reference may be had to Fig. 1 of the drawings. In this particular illustration a central rod 30 having an operating knob or handle 31, functions to control valve 29 for the windshield wiper W, that is, by a rotatable movement imparted to knob 31. This rod also controls the position of the throttle T for the carburetor, the inner extremity of rod 30 being connected by a link 32 to a bell crank 33 beneath the hood of an automobile, and thence by other links 34 and a bell crank 35 to the throttle arm T. Thus pull on knob 31 will operate and control the throttle, and rotation of the same knob will control operation of the windshield wiper. Handle 16, when pulled or rotated, serves to operate the starter switch and the carburetor choke, that is to say, it is so connected for that purpose in the working arrangement shown in Fig. 1. However, this controlling member may be used to operate and control the throttle or other appliances on the engine such as a timer and distributor. As shown however, a link 37 connects bell crank 21 to an electric switch 38 which controls the electric starter S for engine or motor E. Thus by pulling the handle 16 electric switch 38 will be actuated to close the electric circuit for the starter and such switches are usually provided with springs to effect self-opening. A rotatable movement of handle 16 in the present instance serves to operate the carburetor choke, the choke arm 39 at carburetor C being connected by a wire or other push and pull elements 40, to an arm 18 which is affixed to stem 17 of handle 16. A conduit 41 is usually provided for wire 40, but the operating connections between arm 18 and the choke may be of any other suitable kind or character wherewith to impart an oscillatory movement to the choke valve of the carburetor.

Summarizing, rotation of knob 31 controls the windshield wiper, and pull on the same knob controls either the throttle or choke of the carburetor as may be predetermined by the hook-up or connection made between the controls and the carburetor. Rotation of handle 16 controls the choke (or throttle) and pull on handle 16 controls the starter switch and starting of the engine. Thus in starting the choke may be operated simultaneously with the starting of the engine, and then the starter may be released with the choke on or off as desired, dual control being at handle 16 at the election of the operator. In addition lever 7 may be turned by the fingers of the same hand to rotate the electric switch member 5 which controls the ignition circuit and lighting system for the automobile.

In Fig. 1, I represents diagrammatically the ignition circuit, and L represents the lighting circuit. It should be understood that the ignition and lighting circuits may be as commonly employed and that the switch for controlling the same may be of any suitable known kind, except as modified herein to include other control elements at the front and axially thereof substantially as herein shown and described.

The figures on sheet 3 of the drawings, illustrate several modified forms of the invention, in which auxiliary control members are combined with an electric ignition and lighting switch. Thus in Figs. 6 and 7 I show an electric ignition and lighting switch corresponding closely to the switch shown in Fig. 2, excepting that only a single push and pull rod 30′ extends through the switch part. Knob 31′, in this device, is exposed at the front of the operating lever 7′ for the switch, and this knob may be grasped by the hand to pull rod 30′ outwardly a given distance as determined by a stop member 42 on the rod. A link 43 connects the rod with a choke, throttle, distributor, or other engine or motor appliance requiring control.

In Fig. 8 I show an electric switch which corresponds closely to the switch shown in Fig. 6, excepting that the push and pull rod 30″ is provided with a handle 31″ which permits a rotatable movement to be imparted to the rod as well as a push and pull element. The inner end of the rod in this case, is provided with an arm 44 to which a link 45 may be connected so that in imparting a rotatable movement to the rod and arm it becomes possible to actuate some other appliance on the automobile such as the distributor or throttle for the engine. The push and pull movement of rod 30″ may be utilized in this form of the invention to operate the choke or the starter for the engine by a link or connecting element 43′.

In Fig. 10 I show a further modification which corresponds more closely to the device shown in Fig. 2, in that two rotatable push and pull members are combined with an electric switch having a handle 7‴. However, in this form of the device the windshield wiper valve is omitted, and other changes in construction exist. Thus, the central push and pull rod 30‴, is provided at its inner end of the rod with an arm 46, to which a link 47 is connected and whereby a turning movement of handle 31‴ may be utilized to operate the choke or some other appliance on the automobile. A pull movement on handle 31‴ may be utilized to control the spark or distributor for the engine through a link or wire connection 43″. A second handle 16′ having a round stem 17′ serves as a bearing for rod 30‴ and this stem extends through a hollow arbor or shaft 4′ which has rotatable bearing centrally in the base member or casing 2. The casing and the electric switch in this form of the invention is otherwise the same as in Fig. 2, and need not be further described. However, stem 17′ of handle 16′ is provided in this instance with short and long arms 48 and 49 respectively. A link 50 is connected to the longer arm 49, and a pull element 51 may be attached to the shorter arm, whereby a rotative movement of handle 16′ will actuate link 50 and any appliance attached thereto, and a push and pull movement of handle 16′ will be transmitted to a second appliance through the second connecting element 51. Thus with this controller unit it is possible to control or adjust both the choke and spark for the engine by means of the first handle 31‴, and to control and operate the engine starter and throttle by the second handle 16′, while the ignition and lighting switch may be operated independently of the other mechanisms by means of lever 7‴ attached to arbor or shaft 4′.

In each form of device shown and described herein the switch casing or mounting serves as a base member for the switch parts and these in turn support the rotatable push and pull controls, and in each instance the operating handles or finger grips are exposed in front of the switch dial or index plate and the actuating parts concealed behind the instrument board, which contains only a single opening to receive the unit with all its controls. The installation of this single unit is therefore simple and inexpensive compared with the installation of separate fittings for each control at different places on the instrument board, and the operation of all of the controls is centralized and within the reach of the fingers of one hand so that all may be conveniently manipulated in starting and running operations.

What I claim is:

1. A controller attachment for the instrument board of an automobile, comprising an electrical switch, and a reciprocable controlling device rotatably supported within said switch, having two independent lines of power-transmitting connections extending therefrom to different operating devices on said automobile.

2. A controller unit or fitting for the instrument board of an automobile, comprising a mounting, a rotatable controller member, and a pair of push and pull members extending lengthwise of the axis of said rotatable controller member, one of said push and pull members being also rotatable about said axis.

3. A controller attachment for the instrument board of an automobile, comprising an electrical switch member having a rotatable shaft, a push and pull element slidably and rotatably mounted within said shaft, and engaging means at the front end of said shaft, and means connecting said push and pull element with separate operating appliances on said vehicle.

4. A controller attachment for the instrument board of an automobile, comprising an electrical switch, a rotatable push and pull member extending through guided by and axially shiftable with respect to said switch, a second rotatable and axially shiftable push and pull member extending through and guided by said first push and pull member, gripping means for each push and pull member, and connecting means for each of said push and pull members extending to different operating appliances on said automobile.

5. A controller attachment for the instrument board of an automobile, comprising a housing, a switch within said housing, and rotatable push and pull means extending through said switch having separate operating connections with a plural number of operating appliances on said automobile.

6. A controller attachment for the instrument board of an automobile, comprising a housing, a rotatable switch within said housing, a pair of telescoping rotatable push and pull members extending through said housing, and means connecting each of said members with one or more operating appliances on the automobile.

7. A controller attachment for the instrument board of an automobile, comprising a mounting, an electric switch and a valve supported upon said mounting, and a reciprocable control member extending through said switch and valve.

8. A combination controller for a motor driven vehicle, comprising a mounting, a pair of slidable and rotatable control members, movable on a common axis extending through said mounting, means pivotally supported upon said mounting and coupled with said control members, and means connecting said control members and said pivotal means separately to different operating appliances on said vehicle.

9. A combination controller for a motor driven vehicle, comprising a mounting, a pair of control members sleeved rotatably and slidably upon a common axis within said mounting, separate handles at the front of said mounting for each control member, means supported upon and coupled with said control members for operating separate working appliances on said vehicle, and coupling means between said means and said working appliances.

10. A combination controller for a motor driven vehicle, including a fitting for the instrument board of an automobile, a plurality of independent controller members, one movable longitudinally and a second movable rotatably about a common axis independent from each other, and means including oscillating means mounted upon said fitting for connecting each member operatively to a separate working appliance on the automobile.

11. A combination controller for a motor driven vehicle, comprising a push and pull member, a rotatable control member, handles for each member, means for connecting each member to a separate working appliance on the automobile, and a single compact mounting for said members including shiftable coupling members operatively connected with said control members adapted to be inserted through a single opening in the instrument board of the automobile, said push and pull member and said rotatable control member being mounted independently from each other upon a common axis extending through said mounting.

12. A combination controller for a motor-driven vehicle, comprising a mounting and means for attaching the same to the instrument board of the vehicle, a pair of reciprocable and rotatable controller members supported upon said mounting in sleeved relation, means connected with each controller member for transmitting the rotatable movements thereof to separate controlling devices on said vehicle, and means connected with each control member for transmitting the reciprocable movements thereof to still other devices on said vehicle.

13. A combination controller for a motor-driven vehicle, comprising a mounting, a rotatable and reciprocable control member supported by said mounting, an oscillatory lever upon said mounting for transmitting the reciprocable movements of said control member to a controlling device on said vehicle, means connected with said control member to transmit the rotatable movement thereof to a second controlling device on said vehicle, a second rotatable and reciprocable control member extending through said first control member, and means for transmitting the rotatable and reciprocable movements of said second control member to still other controlling devices on the vehicle.

14. An instrument panel control device for manipulating separately operable yet associated parts of a motor vehicle such as the carburetor controls or the like comprising a tubular part extending through the instrument panel at right angles thereto and held in fixed relation to said panel and having an internal longitudinal passageway extending therethrough and through said panel, a pair of members one sleeved within the other disposed in said passageway and independently slidable in the passageway in said tubular part and connected on the inner side of said panel to said manipulatable parts such as the carburetor and the like and each having a separately manually graspable handle on the other side of said panel, said handles being disposed in close proximity to each other whereby one of said members may be reciprocated in said tubular part to the exclusion of the other by pushing or pulling on either one or the other of said handles and whereby both of said handles may be grasped by the fingers of one hand at the same time to reciprocate both of said members simultaneously so that like motions of the hand of the operator effect simultaneous or independent movement of said manipulatable parts depending only upon the selection of one or the other or both of said handles by the fingers of the operator.

In testimony whereof I hereunto affix my signature.

ALBERT J. WEATHERHEAD, JR.